United States Patent [19]

Marques et al.

[11] 4,365,541

[45] Dec. 28, 1982

[54] FILTER ARRANGEMENT FOR AN AIR CIRCULATORY SYSTEM

[75] Inventors: Jerry G. Marques, Decatur; Robert D. Cruthis, East Peoria, both of Ill.

[73] Assignee: Caterpillar Tractor Co., Peoria, Ill.

[21] Appl. No.: 273,872

[22] PCT Filed: Dec. 12, 1980

[86] PCT No.: PCT/US80/01668

§ 371 Date: Dec. 12, 1980

§ 102(e) Date: Dec. 12, 1980

[87] PCT Pub. No.: WO82/02086

PCT Pub. Date: Jun. 24, 1982

[51] Int. Cl.³ .............................................. F24F 3/16
[52] U.S. Cl. ..................................... 98/2.11; 98/38 F; 55/481; 55/482; 55/502; 55/504
[58] Field of Search ................ 55/309, 481, 482, 467, 55/502, 504; 98/2, 2.11, 38 E, 38 F, 38 A, 38 B, 38 D

[56] References Cited

U.S. PATENT DOCUMENTS

| | | | |
|---|---|---|---|
| 1,990,110 | 2/1935 | Bridges | 55/481 X |
| 2,100,072 | 11/1937 | Eilber et al. | 98/38 E |
| 2,613,454 | 10/1952 | White | 55/481 |
| 2,787,946 | 4/1957 | Gannon | 98/38 E |
| 3,318,076 | 5/1967 | Baker | 98/115 LH X |
| 3,517,601 | 6/1970 | Courchesne | 98/38 E |
| 3,555,846 | 1/1971 | Harbeck et al. | 62/244 |
| 3,742,684 | 7/1978 | Wait, Jr. | 55/385 |
| 3,868,896 | 3/1975 | Doll et al. | 98/2.11 |
| 4,007,875 | 2/1977 | Stolz et al. | 98/2.11 X |
| 4,088,463 | 5/1978 | Smith | 55/502 X |
| 4,120,527 | 10/1978 | Lawrence | 296/28 |

*Primary Examiner*—William E. Wayner
*Assistant Examiner*—Harold Joyce
*Attorney, Agent, or Firm*—William C. Perry

[57] ABSTRACT

In an air circulatory system (10) of the cab (11) of an earthmoving vehicle it is desirable to have a source of ambient fresh air (A) combined with existing cab air (R) flowing through the air conditioning unit (22). It is common practice to pass both sources of air through one filter which adversely affects the effectiveness of the air conditioning unit 22. When separate filters are provided for each source of air, however, serviceability has often been sacrificed by having the filters placed in a location that is not easily accessible. The air circulatory system (10) of this invention overcomes these problems by providing two filters (30,32) which are cooperatively mounted within an assembly 28 that directs the first ambient source of air A through both filters (30,32) while providing a chamber (90) which mixes the cabin air (R) with the ambient and directs the combined air only through the second filter (32). The chamber (90) provides a passageway (100) that is sufficient in size to provide an adequate air flow through the air conditioning unit (22) at all times. The filter assembly (28) is provided with mounting guides (64,66,107,108) which allow the filters (30,32) to be easily serviced from a common service point without concern for the destruction of seals (44,128) that are bonded to each filter (30,32) to prevent the ingress of air which has not been filtered.

17 Claims, 4 Drawing Figures

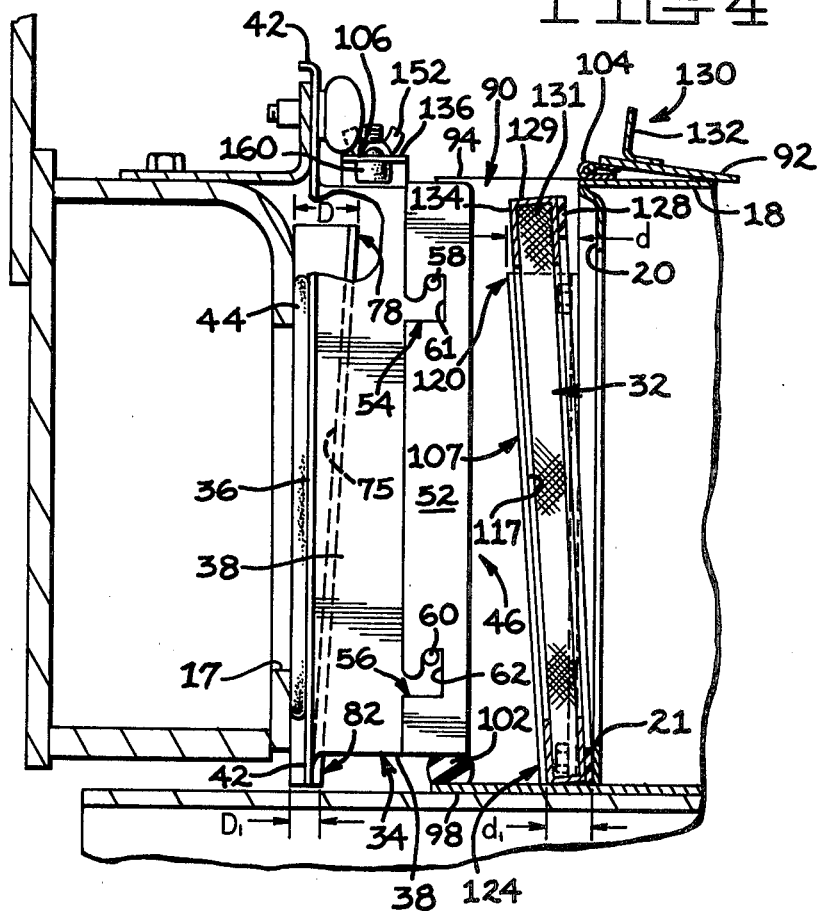

FILTER ARRANGEMENT FOR AN AIR CIRCULATORY SYSTEM

DESCRIPTION

Technical Field

This invention relates generally to a filtering arrangement for an air circulatory system and more particularly to the manner in which a plurality of filters are positioned and mounted within a heating and air conditioning system.

Background Art

In heating and air conditioning systems such as those found employed in the cab of an earthmoving vehicle, for example, it is common practice to draw air into a heating and air conditioning unit from the ambient air outside the confines of the cab. As the air enters the cab it passes through a filter to prevent the entry of dust etc. into the cab. It is also common practice to pass the air already within the cab back through the heating and air conditioning unit for recirculation. This air is often passed through a second filter for further cleaning before it re-enters the unit. These systems commonly supply one filter for each individual air source. These filters are independently mounted and are often positioned in separate locations or in locations that are not easily accessible.

One such system is disclosed in U.S. Pat. No. 3,868,896 to Doll et al, issued Mar. 4, 1975. Another system with a similar filter arrangement is disclosed in U.S. Pat. No. 3,742,684 to Wait, Jr. issued July 3, 1973 and assigned to the assignee of the present invention. In the Doll et al patent the filter for the recirculated air is mounted to a hinged panel at the upper, rear portion of the cab. The panel serves as an access cover to a plenum in which the fresh air and recirculated air are mixed and both sources of air are introduced into the circulatory system by a blower that is mounted within the plenum. Also mounted within the plenum is the fresh air filter. In order to install or remove the fresh air filter it must be maneuvered around the blower and through the narrow access cover. This tends to hinder the proper positioning of the filter. In the Wait, Jr. patent, the filters for both sources of air are located in two separate locations, one being accessible from inside the cab, the other being accessible from outside the cab.

In other air circulatory systems such as those disclosed in U.S. Pat. No. 3,555,846 to C. L. Harbeck et al, issued Jan. 19, 1971 and U.S. Pat. No. 4,120,527 to Lawrence, issued Oct. 17, 1978, and assigned to the assignee of the present invention, one filter is provided for both the fresh air flow and the recirculated air flow. The ability of the filter to effectively clean both sources of air, especially in a dusty environment that is common in the operation of an earthmoving vehicle, is somewhat limited.

The present invention is directed to overcoming one or more of the problems as set forth above.

Disclosure of the Invention

In one aspect of the present invention a filtering arrangement is provided for an air circulatory system having two sources of air flow. The filters are arranged so that the combined flow of both sources of air passes through one of the filters while the other filter is provided only in the flow of one of the air sources.

In another aspect of the invention the two filters are cooperatively mounted to form a passageway through which the two air sources are combined, as well as a means for directing the air flow into one of the filters.

In yet another aspect of the invention, a mounting arrangement for both of the filters is provided that allows each filter to be easily guided into its proper position without undue regard to damaging the filters. The filters are cooperatively mounted in a location that provides easy accessibility to both the filters for simultaneous or individual servicing.

The present invention solves the problem of having an inadequately filtered air supply for an enclosure such as a cab of an earthmoving vehicle. The filtering arrangement of the present invention insures that a minimum amount of filtered air will be introduced within the cab even as the vehicle works in the dustiest of environments.

The filter elements of two sources of air are positioned in line with each other so that the first, most contaminated source of air is directed through both filters while the second source of less contaminated air is continually recirculated through only one of the filters. The filters are cooperatively mounted to form a passageway between the two filter housings which provides for the combination of the second, less contaminated air with the first source of air after the air from the first source has passed through one of the filters. The passageway formed between the two filter housings is of sufficient size to provide an adequate amount of air to the air conditioning unit to effectively control the temperature of the cab.

Another problem prevalent in many air circulatory systems resides in the inaccessibility of the filter location and the resulting difficulty encountered in removal and replacement of the filter elements.

In the present invention the filters are positioned in a location that allows access to both filters from a single point within the vehicle enclosure. The interacting mounting arrangement allows each filter assembly to be removed and serviced individually. During replacement of the filters, the mounting arrangement provides a guide which engages each edge of the filter to urge the filter into its properly installed position.

BRIEF DESCRIPTION OF THE DRAWINGS

FIG. 4 is a fragmentary cross-sectional view similar to FIG. 3 showing the filter arrangement of the present invention is a position for servicing.

BEST MODE FOR CARRYING OUT THE INVENTION

Figure 1:
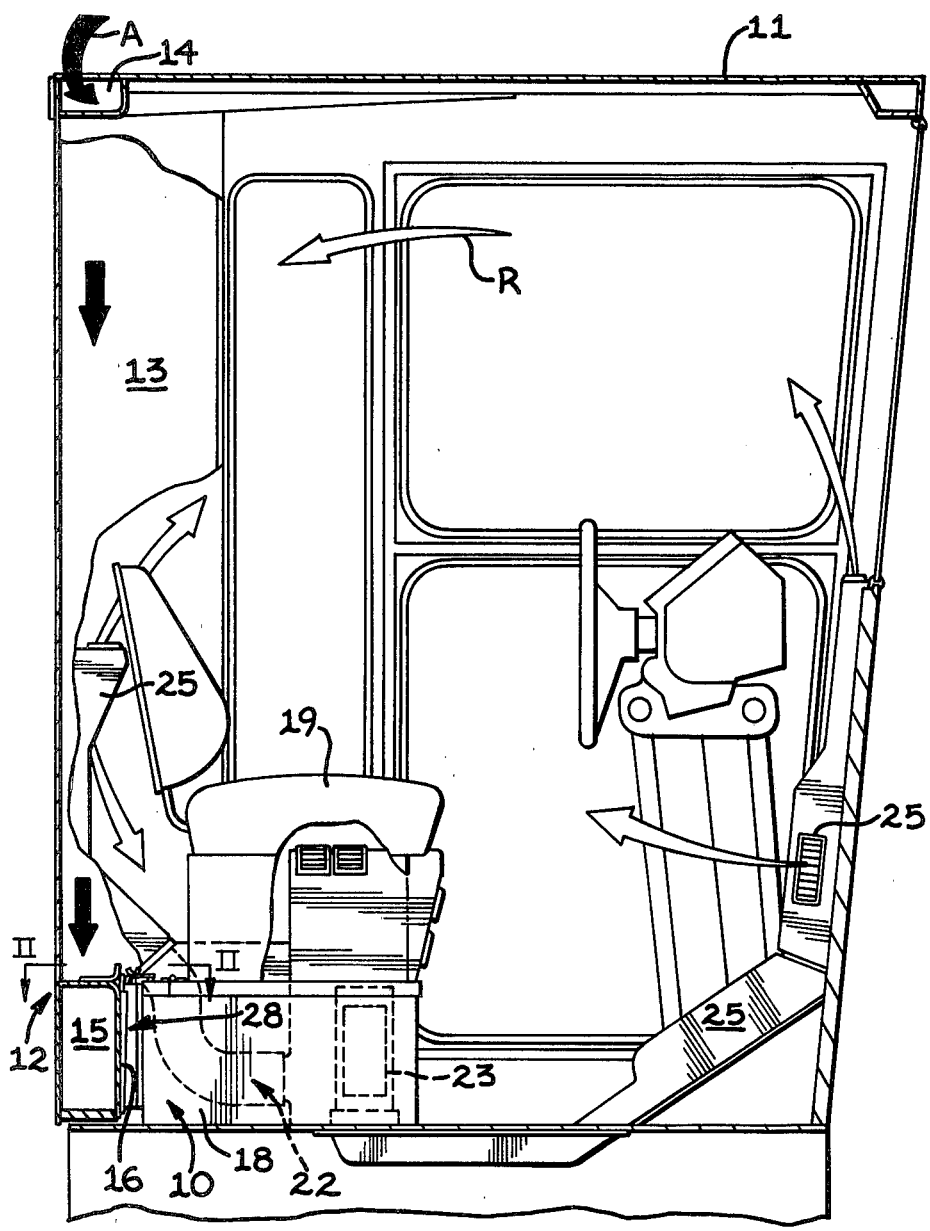
FIG. 1 is a cross-sectional view of a vehicle cab which embodies the air circulatory system of the present invention.

Referring now to the drawings and more particularly to FIG. 1; an air circulatory system 10 is provided for a cab 11 of an earthmoving vehicle (not shown) in which an operator normally sits to manipulate the controls of the vehicle. The cab has a framework means 12 which comprises a pair of vertical tubular posts 13 positioned at each corner of the cab. Each post 13 has an opening or inlet 14 at its upper end. A crossmember 15, which is also tubular, extends between the two vertical posts at their lower extremities and communicates with the inner portion of posts 13. The crossmember has an inwardly facing surface 16 within which is formed an opening 17. The framework of the cab further includes a seat frame 18 which supports a seat 19. The seat frame is spaced internally of crossmember 15 and has a rearwardly facing surface 20 which has an opening 21 positioned therein to line up with opening 17 formed in crossmember 15.

An air conditioning unit 22 is housed within the seat frame 18 which serves to control the environment of cab 11. The term air conditioning is used in its broadest sense to mean any treatment of air such as heating, cooling, dehumidifying, etc. The various air conditioning components, including blower units 23, are positioned within the air circulatory system 10 to provide treatment of air as it is drawn therethrough by the blower units 23 and dispersed within the confines of the cab through air ducts 25. The blowers draw air from an ambient air source A through inlets 14 of tubular posts 13 where it flows down the interior of the post and into crossmember 15. From within the crossmember the air exits through opening 16 and is directed through opening 21 in seat frame 18 whereupon it passes through the air conditioning components for treatment and dispersement.

Positioned between crossmember 15 and the seat frame 18 is a filter assembly shown generally at 28 which serves to clean the air as it passes therethrough. The filter assembly (FIGS. 2 and 3) comprises a pair of first and second filters 30 and 32 which are mounted to the crossmember 15 and seat frame 18 respectively.

The first filter 30 is mounted within a separable housing 34 which comprises a base plate 36 from which extend a plurality of walls 38 to form an open ended filter recepticle 40. The walls of the recepticle are spaced inwardly from the periphery of the base plate forming a flange 42 which surrounds the filter recepticle. An opening 43 is positioned within the base plate radially inwardly of the walls 38. A seal 44 is secured to the base plate along the periphery of opening 43 on the opposite side of the base plate from the recepticle 40.

A closure element 46 (FIG. 3), having a base 47 and three sidewalls 48,50, and 52, is provided so that base 47 will overlay the open end of recepticle 40 with the sidewalls 48,50, and 52 positioned outwardly of an adjacent the three walls 38 of recepticle 40. Walls 48 and 52 of the closure element have a pair of "L" shaped slots 54 and 56, (FIG. 4) formed therein which engage a pair of posts 58 and 60 that extend from two of the walls 38 of recepticle 40. When the closure element is positioned so that posts 58 and 60 rest in a pair of legs 61 and 62 of slots 54 and 56, movement of the closure element away from base plate 36 is prevented. Therefore, filter 30 may be positioned to be captured by closure element 46 within recepticle 40, so that a seal 63, which is positioned along the outer edge of filter 30, is held in sealing engagement with base plate 36 to allow no air to pass between the filter 30 and the base plate 36.

Figure 2:
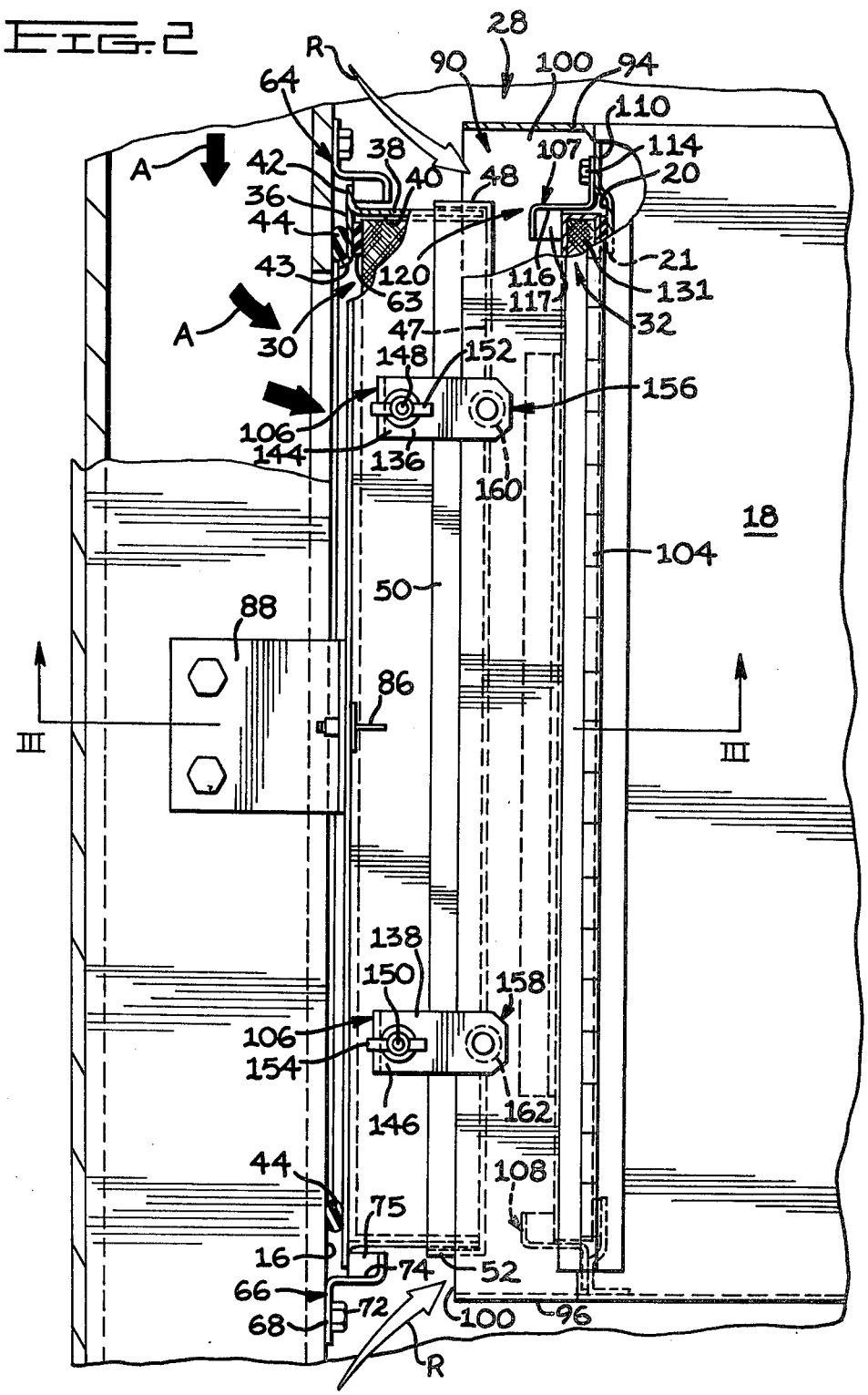
FIG. 2 is a fragmentary top view of the filter arrangement of the present invention and section through the cab taken along lines 2—2 of FIG. 1.

The filter housing 34 is mounted to crossmember 15 by a pair of guide means 64 and 66 (FIG. 2) which are positioned on each side of opening 17. Since each of the guide means have identical components, only guide 66 will be described in detail and is best shown in FIG. 2. The guide means each have a first member 68 which extends vertically along the surface 16 of the crossmember and is secured thereto by a plurality mounting bolts 72. A second member 74 extends from member 68 towards the opening 17 and forms a downwardly extending channel 75 which is tapered with respect to surface 16 of crossmember 15. The upper end 78 (FIG. 4) of member 74 is spaced from the crossmember a first distance D while the lower ends 82 of member 74 is spaced from the crossmember a second distance $D_1$. When the flange 42 of filter housing 34 is positioned within channels 75, seal 44 is urged into engagement with surface 16 of crossmember 15 at the lower end 82 of the channels because the distance $D_1$ is less than the combined width of flange 42 and seal 44. Seal 44 is urged into engagement with surface 16 of crossmember 15 at its upper portion by a threaded fastener or wingnut 86 which extends through flange 42 to threadably engage an upwardly extending mounting flange 88 of crossmember 15.

The second filter means 32 of filter assembly 28 is mounted to seat frame 18 overlaying opening 21. The filter is positioned within a chamber 90 formed by a plurality of walls 92,94,96,98 which extend from the rear of the seat frame toward crossmember 15 to generally overlap the end of filter housing 34.

Figure 3:
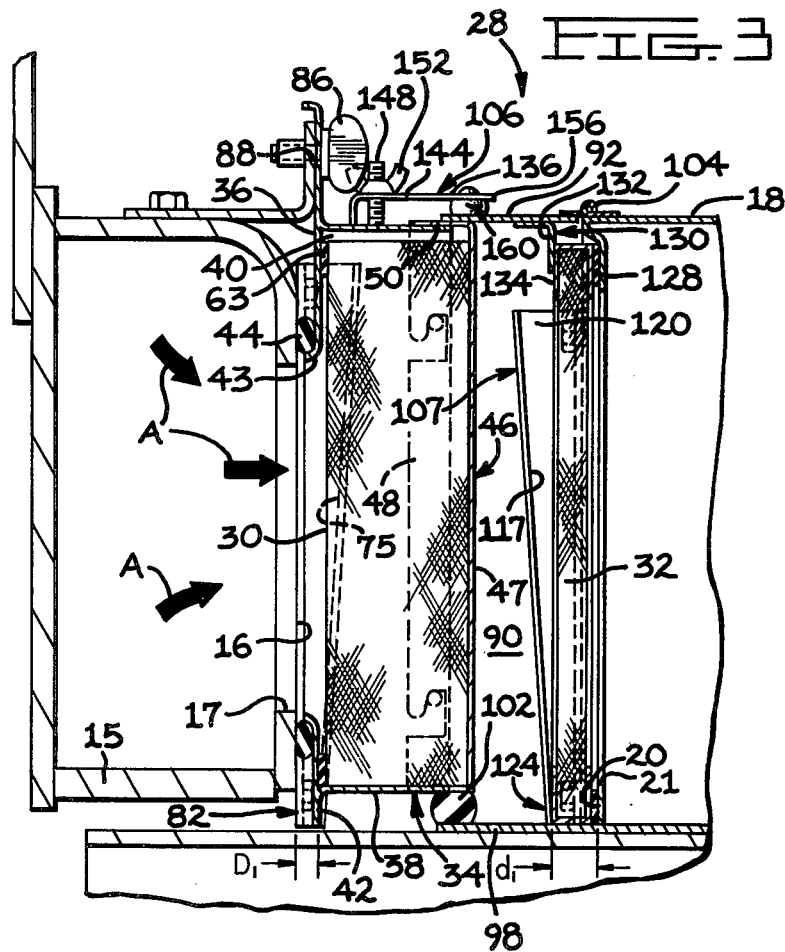
FIG. 3 is a fragmentary cross-sectional view, taken along lines 3—3, of the filter arrangement shown in FIG. 2.

Walls 94 and 96 are vertical walls which extend from seat frame 18 and form an opening or passageway 100 between walls 94 and 96 and each vertical side of filter housing 34. Wall 98 is a horizontally extending wall which forms the bottom of chamber 90 and extends from the seat frame to engage the lower portion of filter housing 34 through a seal 102 that is interposed between wall 98 and filter housing 34. The seal is bonded to wall 98 while filter housing 34 is forced into contact with the seal 102 as an incident of its mounting to crossmember 15 as previously described. Wall 92 is a horizontally extending wall which forms the upper wall of chamber 90 and is pivotally mounted to seat frame 18 by a hinge 104. Wall 92 is movable between a first position whereby it is held in engagement with the upper edge of filter housing 34 by a fastening means 106 which will be described in greater detail hereinafter, and a second position wherein wall 92 is pivoted away from the filter housing to leave the upper portion of chamber 90 exposed, as shown in FIG. 4. When wall 92 is in its first position as shown in FIG. 3, it forms the upper portion of passageway 100, and serves to communicate air from a second, recirculated source R within the cab with chamber 90.

Filter 32 is secured by a second pair of guides 107 and 108 which act identically to guides 64,66. The guides 107,108 are positioned on each side of opening 21, and since they are identical components, only guide 107 will be described in detail for the sake of clarity. Guide 107 has a first member 110 which is mounted to seat frame 18 by bolts 114. A second member 116 extends from the first member to form a channel 117 that is tapered with respect to seat frame 18. The channel is spaced from the seat frame a first distance d (FIGS. 2 and 4) at an upper end 120 of member 116 while being spaced from the seat frame a second distance $d_1$ at a lower end 124. A seal 128 is bonded to a peripheral sheathing 129 which houses the filter element 131 of filter 32 and when the filter is positioned within the guide 107, the seal is urged into engagement with surface 20 of seat frame 18 at its lower extremity by the lower ends 124 of the guides whose distance $d_1$ is less than the combined thickness of the filter and the seal. The upper end of filter 32 is held in sealing engagement with the seat frame by a filter retaining means 130 (FIGS. 3 and 4) that is mounted to the lower portion of chamber wall 92. Retaining means 130 comprises a downwardly extending flange 132 mounted to the underside of wall 92 a distance from seat frame 18 approximately equal to $d_1$. As wall 92 is pivoted toward its first position, flange 132 engages the backside 134 of filter 32. As movement of wall 92 continues, flange 132 moves the filter 32 and seal 128 into engagement with seat frame 18.

The fastening means 106 consits of a pair of horizontally extending clamping members 136 and 138. Each clamping member has a first end 144,146 pivotally engaged with a pair of threaded posts 148,150 that extend vertically from filter housing 34. A pair of threaded fasteners in the form of wingnuts 152,154 are threadably engaged with posts 148,150 to vertically adjust the location of the clamp members with respect to the posts. A second end of 156,158 of clamps 136,138 have a snubber 160,162 mounted thereon which engages the upper portion of wall 92 to hold the wall against the filter housing, and thus the filter 32 in engagement with seat frame 18.

Industrial Applicability

During the course of operation of the air conditioning unit 22, upon actuation of blower motor units 23, air is drawn through the air conditioning unit and circulated within the cab through a series of ducts 25. Ambient air A from outside the cab is drawn through inlet 14, structural post 13, to opening 17 in crossmember 15, whereupon it enters the cab. As it passes through opening 17 it flows through fresh air filter 30 which provides an initial cleansing; ridding the air of dust and other particulate matter. As it exits filter 30, the air passes through chamber 90 and into the second filter 32 where it is filtered a second time. Also, as the air enters chamber 90 it is mixed with air from source R which has been circulating within the cab. This recirculating air enters into chamber 90 through passageways 100 which extend vertically between the chamber sidewalls 94 and 96 and the first filter housing 34. Here it mixes with the fresh air entering the chamber from filter 30 as previously described and is directed through the second filter 32 for additional filtering and re-conditioning along with the fresh air.

As operation of the vehicle to which the air conditioning system is attached continues, the harsh environment will eventually cause the filters, more particularly filter 30, to become contaminated to a point wherein a proper amount of fresh air is not being allowed into the system. Should the instance arise whereby the fresh air filter becomes too contaminated for proper air flow, passages 100 are of sufficient size to allow enough recirculated air to pass through filter 32 and the air conditioning components for proper treatment of cabin air, until the filter assembly 28 can be serviced.

To service the filters 30,32 of filter assembly 28 the wingnuts 152,154 of fastening mean 106 may be loosened from their clamp retaining position on threaded posts 148,150. Upon sufficient loosening of the wingnuts, clamping members 136 and 138 may be rotated about their respective posts, out of engagement with the movable wall 92 of chamber 90 as shown in FIG. 4. Wall 92 may then be pivoted about hinge 104 to its second position wherein flange 132 on wall 92 no longer retains filter 32 against seat frame 18. This also exposes the upper portion of filter 32, thus facilitating its removal. Wingnuts 86 may then be removed which will release the upper portion of first filter housing 34 from engagement with crossmember 15. The entire filter housing 34 may then be removed by sliding it upwards along tapered channels 75. After the filter housing 34 is removed, posts 58 and 60 may be disengaged from slots 54,56 in closure element 46 to expose filter element 30 for its removal and subsequent cleaning or replacement.

Reassembling the filter unit 28 may be accomplished by a mere reversal of the steps taken to remove the filters. After repositioning of the filter 30 within filter housing 34, the flange 42 of the housing may be placed in the upper or filter receiving ends 78 (FIGS. 3 and 4) of tapered channels 75 of guides 64,66. Since filter housing 34 will be in sealing engagement with the surface 16 of crossmember 15, it is most important that the integrity of the seal 44 be preserved when moving the filter housing 34 into position. To accomplish this, the upper ends 78 of channels 75 are spaced a distance D from the crossmember; a distance which is greater than the combined width of the filter housing 34 and the seal. The filter housing may rest on the tapered channel 75 of the guides as it is lowered into position thus allowing seal 44 to remain out of engagement with surface 16 of crossmember 15 until the housing approaches the lower ends 82 of the channels whereupon the seal is urged into engagement only at its lower extremity. The remainder of the seal, as the filter rests on the tapered channels 75 of guides 64,66, remains out of engagement to avoid the impartation of any shear forces on the seal face which could cause its destruction. When the lower portion of housing 34 is in position, the upper portion may then be moved toward crossmember 15 (out of engagement with tapered channels 75, other than at the lower end) for engagement of the seal, along its entire face, with surface 16 of crossmember 15. Wingnut 86 may be reengaged with mounting flange 88 to secure filter housing 34 in its proper position.

Filter 32 is installed utilizing the same mounting features exhibited in the installation of filter housing 34 and is illustrated in a partially installed position in FIG. 4. Since it is important not to damage seal 128 on filter 32, the filter is guided into position while it rests on tapered channels 117, until it reaches the lower ends 124 of the channel. Since the spacing of the lower ends 124, is a distance designated $d_1$, and that distance is less than the combined width of the filter 32 and seal 128, the filter and seal will be in proper engagement with seat frame 14 only at the lower ends 124, of guides 107,108. The filter 32 will remain resting on channels 117, until such time when movable wall 92 is moved toward its first position. As it rotates into position, flange 132 which extends from the underside of wall 92, will engage side 134 of filter 32. As movement of the wall continues, filter 32 and seal 128 are moved toward seat frame 18 for engagement with surface 20. Upon completion of movement of wall 92, filter 32 will be in its proper position overlaying opening 21 and providing an airtight seal therearound. The fastening means 106 may be re-engaged with wall 92 and secured by wingnuts 152 to complete the assembly.

The filter assembly as described above provides an air circulatory system that allows the most contaminated source of air to be cleaned by two separate filters placed in line with each other in the air passageway approaching the air conditioning components. The filters are mounted such that the individual filter housings cooperate with each other to form a mixing chamber for recirculated and fresh air, combining them before they enter the second of the two filters while bypassing the first filter. This assures an adequate amount of air flow through the air conditioner at all times.

The filter mounting arrangement also accommodates the servicing of both filters since both are easily accessible from the same service point and may be removed and re-installed from that point. The mounting arrangement further enhances serviceability by providing tapered mounting guides which assure sealing of the filters to their appropriate housing at a location furthest away from the service point, while at the same time accommodates the preservation of the seal integrity during installation or removal.

Other aspects, objects and advantages of this invention can be obtained from a study of the drawings, the disclosure and the appended claims.

We claim:

1. An air circulatory system (10) for a vehicle cab (11), comprising:
   cab frame means (12);
   a first air passageway (17,21) formed in said cab frame means (12) connected to a first source of air (A) for communicating air to said cab (11);
   first filter means (34) having a predetermined width and being connected to said cab frame means (12) and positioned about said first air passageway (17,21) for filtering the air from said first air source (A) as it passes through said first air passageway (17,21);
   second filter means (32) having a predetermined width and being connected to said cab frame means (12) and serially positioned in said first air passageway (17,21) with respect to said first air source (A); and
   chamber means (90) for directing recirculated air within said cab (11) for movement into said first air passageway (17,21) providing a second source of air (R) downstream from said first filter means (34) and upstream of said second filter means (32) for filtering of said air from both sources (A,R) by said second filter means (32), said chamber means (90) being defined by a plurality of walls (92,94,96,98) positioned about said first and second filter means (34,32) to form a second air passageway (100) between said chamber means (90) and first filter means (34), one of said chamber walls (92) having filter retaining means (130) positioned thereon and being pivotally mounted to said cab frame means (12) to be movable between a first filter retaining position wherein said one wall (92) is engaged with said first and second filter means (32,34), and a second non-retaining position wherein said one wall (92) is pivoted away from engagement with said first and second filter means (32,34) to allow removal and installation thereof.

2. An air circulatory system (10) as set forth in claim 1 wherein said first air passageway (17,21) communicates with ambient air outside the confines of said cab (11).

3. An air circulatory system (10) as set forth in claim 1 wherein the filter retaining means (130) positioned on said movable chamber wall (92) engages one end of said second filter means (32) in said first position and a pair of tapered channels (75,117) having a filter engaging end portion (82,124) of a size smaller than said predetermined width of said second filter means (32) are positioned to engage the opposite end of said second filter means to cooperatively urge said second filter means (32) into continuous sealing engagement with said cab frame means (12).

4. A filter assembly (28) for an air circulatory system (10), comprising:
   a first frame member (15) having a first opening (17) formed therein;
   a second frame member (18) having a second opening (21) formed therein, said second frame member (18) being juxtaposed to said first frame member (15), said second opening (21) being positioned in line with said first opening (17);
   a first air source (A) being in communication with said first and second openings (17,21) in said first and second frame members (15,18);
   first filter means (34) connected to said first frame member (15) and being positioned about said first opening (17) for filtering air from said first air source (A) as it passes therethrough;
   a second air source (R) being in communication with said second opening 21;
   second filter means (32) connected to said second frame member (18) and being positioned about said second opening (21) for filtering air from said first and second air sources (A,R);
   chamber means (90) mounted to said second frame member (18), said chamber (90) including a plurality of wall members (92,94,96,98) which define a third opening (100) for directing said second air source (R) past said first filter means (34) and into said second filter means (32), one of said wall members (92) having a filter retaining means (130) positioned thereon, said one wall member (92) being pivotally movable between a first filter retaining position wherein said one wall member (92) is engaged with said first filter means (34) to form a portion of said third opening (100) and wherein said retaining means (130) urges said second filter means (34) into sealing engagement with said second frame member (18), and a second, non-retaining position wherein said one wall member (92) is disengaged from said first filter means (34) to provide access to said first and second filter means; and
   mounting means (64,66,107,108,130,86) for securing said first and second filter means (32,34) to said first and second frame members (15,18) respectively.

5. A filter assembly (28) as set forth in claim 4 wherein said first and second filter means (32,34) include:
   a filter housing (34,129);
   a filter element (30,131) secured within said housing (34,129); and
   a seal (44,128) connected to said filter housing (34,129) and being positioned to sealingly engage said respective frame member (15,18).

6. A filter assembly (28) as set forth in claim 4 wherein said filter retaining means (130) includes a flange member (132) extending from said wall member (92) and being positioned to engage said second filter means (32) and urge it into engagement with said second frame member (18) when said wall member (92) is in said first position.

7. A filter assembly (28) as set forth in claim 4 wherein said mounting means (64,66,107,108) include tapered channels (75,117) connected to said first and second frame members (15,18), said channels being positioned on each side of said first and second openings (17,21).

8. A filter assembly (28) as set forth in claim 7 wherein each of said tapered channels (75,117) form an entry end portion (78,120) that is spaced from the respective frame member (15,18) a distance (D,d) that is greater than the respective width of the filter means (32,34) and an opposite, filter engaging end portion (82,124) that is spaced from said respective frame member (15,18) a distance (D$_1$,d$_1$) that is less than said respective width of the filter means (32,34).

9. A filter assembly (28) as set forth in claim 8 wherein each of said filter means (32,34) is held in engagement with their respective frame member (15,18) at one end by said filter engaging end portion (82,124) of said tapered channel (75,117) and at their opposite end by a filter retaining means (86,130).

10. A filter assembly (28) as set forth in claim 9 wherein said filter retaining means (86) is a threaded fastener (86).

11. A filter assembly (28) as set forth in claim 4 wherein said air circulatory system (10) is used in a cab (11) of a vehicle.

12. A filter assembly (28) as set forth in claim 11 wherein said first air source (A) is ambient air located outside the vehicle cab (11).

13. A filter assembly (28) as set forth in claim 11 wherein said second air source (R) consists of air within the vehicle cab (11).

14. A filter assembly (28) for an air circulatory system (10), comprising:
- frame means (12) having an air passageway (17,21) defined therein;
- first filter means (34);
- second filter means (32);
- first guide means (64,66) for positioning said first filter means (34) substantially across said air passageway (17,21);
- first fastening means (86) for releasably sealingly, retaining said first filter means (34) against said frame means (12) in cooperation with said first guide means (64,66);
- second guide means (107,108) for positioning said second filter means (32) substantially across said air passageway (17,21); and
- second fastening means (106,130) for releasably, sealingly retaining said second filter means (32) against said frame means (12) in cooperation with said second guide means (107,108) and said first filter means (34).

15. A filter assembly (28) as set forth in claim 14 wherein said first and second guide means (64,66,107,108) each include a pair of tapered channels (75,77) having an end portion (82) that is of a size sufficient for urging the lower portion of said first and second filter means (32,32) into sealing engagement with said frame means (12), and said first and second fastening means (86,106) sealingly secures the upper portion of said first and second filter means (34,32) to said frame means (12).

16. A filter assembly (28) as set forth in claim 14 wherein said second fastening means (106,130) includes:
- a wall member (92) having a flange member (132) extending therefrom and being mounted to said frame means (12), said wall member (92) being movable between a first position wherein said flange member (132) engages said second filter means (32) and urges it into sealing engagement with said frame means (12) and a second position wherein said wall member (92) is disengaged from said second filter means (32) to allow removal thereof from said filter assembly (28).

17. A filter assembly (28) as set forth in claim 16 wherein said second fastening means (106,130) further includes:
- at least one threaded member (148,150) extending from said first filter means (34);
- at least one clamping member (136,138) having a first and second end portion (144,146,156,158), said first end portion (144,146) being pivotally engaged with said threaded member (148,150), said clamping member (136,138) being movable between a first position wherein said second end portion (156,158) of said clamping member (136,138) engages said wall member (92) when said wall member (92) is in its first position to capture the wall member (92) between said second end portion (156,158) of said clamping member (136,138) and said first filter means (34), and a second position wherein said second end portion (156,158) is pivoted away from engagement with said wall member (92); and
- means (152,154) for threadably engaging said threaded member (148,150), said means (152,154) being releasably engageable with said clamping member (136,138) to allow selective movement of the clamping member (136,138) between its first and second positions.

* * * * *